US011694682B1

United States Patent
Reinspach et al.

(10) Patent No.: US 11,694,682 B1
(45) Date of Patent: Jul. 4, 2023

(54) TRIGGERING VOICE CONTROL DISAMBIGUATION

(71) Applicant: Amazon Technologies, Inc., Reno, NV (US)

(72) Inventors: Julia Reinspach, Seattle, WA (US); Oleg Rokhlenko, Kirkland, WA (US); Ramakanthachary Gottumukkala, Sammamish, WA (US); Giovanni Clemente, Seattle, WA (US); Ankit Agrawal, Bellevue, WA (US); Swayam Bhardwaj, Seattle, WA (US); Guy Michaeli, Seattle, WA (US); Vaidyanathan Puthucode Krishnamoorthy, Seattle, WA (US); Costantino Vlachos, Seattle, WA (US); Nalledath P. Vinodkrishnan, Bellevue, WA (US); Shaun M. Vickers, Seattle, WA (US); Sethuraman Ramachandran, Issaquah, WA (US); Charles C. Moore, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 222 days.

(21) Appl. No.: 16/711,043

(22) Filed: Dec. 11, 2019

(51) Int. Cl.
*G10L 15/22* (2006.01)
*G10L 15/30* (2013.01)
(Continued)

(52) U.S. Cl.
CPC ............ *G10L 15/22* (2013.01); *G06F 3/0481* (2013.01); *G06F 3/0484* (2013.01); *G06F 3/167* (2013.01);
(Continued)

(58) Field of Classification Search
CPC ...... G06F 3/0481; G06F 3/0484; G06F 3/167; G10L 15/1815; G10L 15/19; G10L 15/22;
(Continued)

(56) References Cited

U.S. PATENT DOCUMENTS

2004/0172258 A1* 9/2004 Dominach .............. G10L 15/22
704/277
2008/0243777 A1* 10/2008 Stewart ................. G06F 16/367
(Continued)

OTHER PUBLICATIONS

International Search Report and Written Opinion issued in PCT Application No. PCT/US2020/063811, dated Mar. 23, 2021.
(Continued)

*Primary Examiner* — Eric J. Bycer
(74) *Attorney, Agent, or Firm* — Hogan Lovells US LLP

(57) ABSTRACT

In various embodiments, a voice command is associated with a plurality of processing steps to be performed. The plurality of processing steps may include analysis of audio data using automatic speech recognition, generating and selecting a search query from the utterance text, and conducting a search of database of items using a search query. The plurality of processing steps may include additional or different steps, depending on the type of the request. In performing one or more of these processing steps, an error or ambiguity may be detected. An error or ambiguity may either halt the processing step or create more than one path of actions. A model may be used to determine if and how to request additional user input to attempt to resolve the error or ambiguity. The voice-enabled device or a second client device is then causing to output a request for the additional user input.

21 Claims, 8 Drawing Sheets

(51) Int. Cl.
*G06F 3/16* (2006.01)
*G06F 3/0484* (2022.01)
*G06Q 30/06* (2012.01)
*G06F 3/0481* (2022.01)
*G10L 15/19* (2013.01)
*G10L 15/18* (2013.01)
*G06Q 30/0601* (2023.01)

(52) U.S. Cl.
CPC ...... *G06Q 30/0625* (2013.01); *G10L 15/1815* (2013.01); *G10L 15/19* (2013.01); *G10L 15/222* (2013.01); *G10L 15/30* (2013.01); *G10L 2015/223* (2013.01)

(58) Field of Classification Search
CPC .............. G10L 15/30; G10L 2015/223; G06Q 30/0625
See application file for complete search history.

(56) References Cited

U.S. PATENT DOCUMENTS

| | | | |
|---|---|---|---|
| 2011/0054900 A1* | 3/2011 | Phillips | G10L 15/30 704/235 |
| 2011/0055309 A1 | 3/2011 | Gibor | |
| 2011/0131036 A1* | 6/2011 | DiCristo | G10L 15/22 704/9 |
| 2012/0016678 A1* | 1/2012 | Gruber | G10L 15/183 704/275 |
| 2019/0206389 A1* | 7/2019 | Kwon | G10L 15/075 |
| 2019/0295542 A1* | 9/2019 | Huang | G10L 15/30 |
| 2019/0324780 A1 | 10/2019 | Zhu | |
| 2019/0391828 A1* | 12/2019 | Tokuhashi | G06F 3/0482 |
| 2020/0342522 A1 | 10/2020 | Agarwal | |
| 2021/0151053 A1* | 5/2021 | Takahashi | G06F 3/167 |

OTHER PUBLICATIONS

Non-Final Office Action issued in U.S. Appl. No. 16/711,046 dated Jul. 6, 2021.
Final Office Action issued in U.S. Appl. No. 16/711,046 dated Nov. 29, 2021.
Non-Final Office Action issued in U.S. Appl. No. 16/711,046 dated Jun. 8, 2022.
Final Office Action issued in U.S. Appl. No. 16/711,046 dated Dec. 9, 2022.

* cited by examiner

TRIGGERING VOICE CONTROL DISAMBIGUATION

BACKGROUND

Smart devices and digital assistants are able to help users with many tasks. In particular, voice-based control has become a popular and convenient way of interacting with such devices. This allows users to interact with the devices without having to hold or touch them or having to navigate through a graphic interface. It is even possible for users to online shop through voice interactions. For example, a user could provide a voice command such as "add diet cola to cart", and such an item would be added to their online shopping cart associated with the device. However, due to many variables, the user's intentions may not be fully understood. For example, the user's speech may not be correctly understood. In some cases, even if the user's speech is correctly understood, the digital assistant may still not know what exact product the user is looking for based on the single command alone, thus causing friction in the purchasing process and user experience.

BRIEF DESCRIPTION OF THE DRAWINGS

Various embodiments in accordance with the present disclosure will be described with reference to the drawings, in which.

DETAILED DESCRIPTION

Figure 1A:
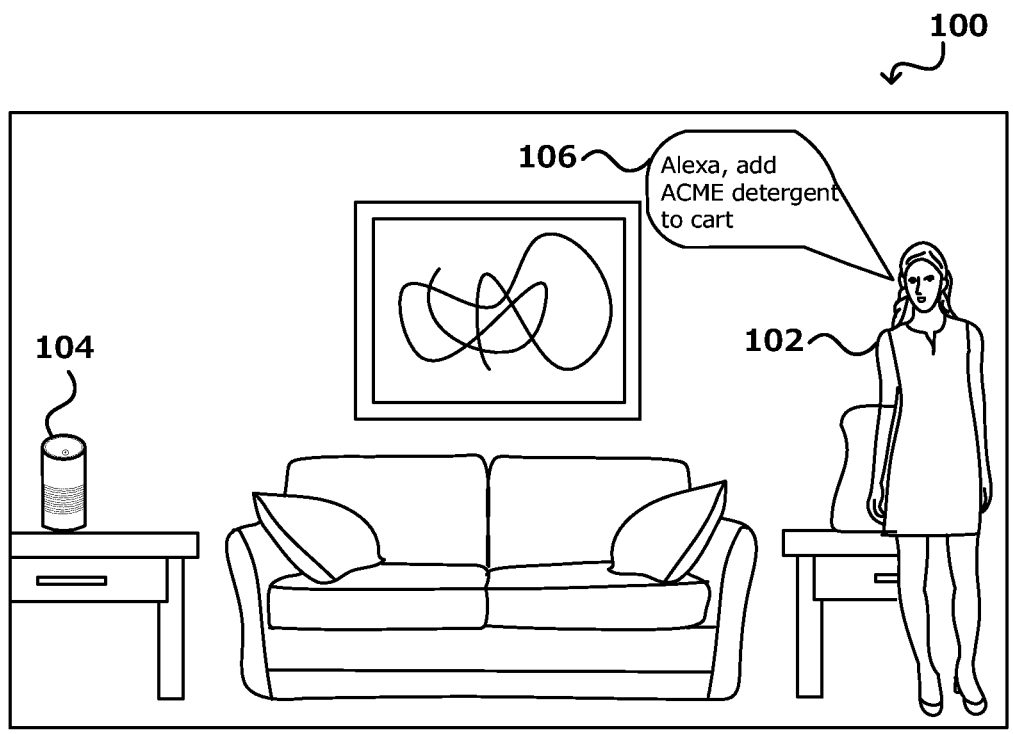
FIGS. 1A-1B illustrate an example of performing e-commerce operations over voice control, in accordance with example embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. Systems and methods in accordance with various embodiments of the present disclosure may overcome one or more of the aforementioned and other deficiencies experienced in conventional approaches for voice control technology. In particular, various embodiments are directed to generating feedback prompts in response to a user voice directive that causes ambiguity.

In various embodiments, a user may utter a voice directive that is detected and picked up by a voice-enabled electronic device as an "utterance". The utterance is then processed either on the device or transmitted to a remote server for processing. Specifically, the utterance undergoes an automatic speech recognition (ASR) process, wherein the utterance text is determined. In some embodiment, it may be determined that the utterance is related to a certain type of request. This may be done by detecting for certain keywords, sentence structure, vocal tone, among other information provided in the utterance. For example, it may be determined that the utterance is related to shopping. Alternatively, the utterance may be determined to be an information request, a device control input, among others. In some embodiments, the utterance may then be processed in the context of that type of request. This may include employing a natural language understanding (NLU) and/or name entity recognition (NER) framework specific to that type of request.

In some embodiments, each type of request is associated with a plurality of processing steps to be performed. Thus, the present request is associated with a plurality of processing steps. The plurality of processing steps may include analysis of the utterance text using a language understanding framework associated with the type of request, generating and selecting a search query from the utterance text, conducting a search of database of items using a search query. The plurality of processing steps may include additional or different steps, depending on the type of the request. In performing one or more of these processing steps, an error or ambiguity may be detected. An error or ambiguity may either halt the processing step or create more than one path of actions. An example of an error may be being unable to understand a portion of the user's utterance. An example of an ambiguity may be that the product search produced are two products and does not know which one the user wants to add to their cart. A model is then used to determine if and how to request additional user input to attempt to resolve the error or ambiguity. The voice-enabled device or a second client device is then causing to output a request for the additional user input. Generally, the model is configured to be trained to optimize for certain metrics such as response rate, purchase rate, customer satisfaction, among other positive user behaviors. For example, the model can learn how users react to a certain type of feedback prompt under certain conditions in the past, and use that information to determine if that type of feedback prompt is actually helpful or beneficial under those conditions. It may be the cause that the model learns that users are more likely not to respond or abandon the interaction when prompted for feedback in that manner. Thus, it would be less likely to select that type of prompt under those conditions in the future.

In some embodiments, the model may determine to request feedback from the user via the voice-enabled client device over voice. This may be the case when the feedback prompt is relatively simple to communicate over voice and the expected response can be effectively captured over voice, such as asking the user to select between two defined choices. Alternatively, the feedback model may determine to request feedback from the user in the form of a graphical interface element for display on a second client device. Specifically, the feedback model may cause the e-commerce platform is generate a prompt somewhere in the interface for the user account, such as in the cart, via a notification, or the like, to collect the feedback.

FIG. 1A illustrates an example environment 100 wherein a user 102 is interacting with a voice-enabled communications device 104. A voice-enable communications device includes, for example, any device having a microphone or other component configured to generate audio data from sound in the frequency range in which humans communicate. Although a voice communications device (e.g., an Amazon Echo®) is illustrated, it should be understood that the device 104 may be various other types of electronic devices that are capable of outputting audio and which have audio playback controls. These devices can include, for example, speakers, receivers, notebook computers, ultrabooks, personal data assistants, video gaming consoles, televisions, set top boxes, smart televisions, portable media players, unmanned devices (e.g., drones or autonomous vehicles), wearable computers (e.g., smart watches, smart glasses, bracelets, etc.), display screens, display-less devices, virtual reality headsets, display-enabled devices, smart furniture, smart household devices, smart vehicles, smart transportation devices, and/or smart accessories, among others. The voice-enabled communications device 104 can communicate with a server over at least one network, such as the Internet, a cellular network, a local area network (LAN), an Ethernet, Wi-Fi, or a dedicated network, among other such options.

As will be described further herein, voice-enabled communications devices include devices that utilize a wakeword or other predetermined sound profile to activate some functionality (e.g., send data to a remote device, such as audio input data for speech analysis) as well as button-activated devices that utilize a button (graphical, physical, or both) to enable some audio-related functionality (e.g., a sound-capturing and sending mode). In this example, user 102 can speak a request within an environment where the voice-enabled communications device 104 is located. The request may be any question, inquiry, instruction, phrase, or other set of one or more words/sounds. For example, the user may say, "Alexa®, turn on kitchen lights" In this example, the word "Alexa®" has a special connotation, in that it may be referred to as a wakeword, or activation word (the wakeword would be a different word, or a particular phoneme or a particular sound, such as the sound made by clapping or snapping your fingers). In particular, a wakeword may be detected within audio input data detected by one or more microphones located on the voice-enabled communications device. Persons of ordinary skill in the art will recognize, however, that the one or more microphones may alternatively be located on a separate device in communication with the voice-enabled communications device. In some embodiments, after the wakeword is detected, the voice-enabled communications device may begin interpreting/analyzing audio input data until no more speech is detected.

In general, the voice-enabled communications device 104 constantly listens for the wakeword and is otherwise inactive. Once the wakeword is recognized, the voice-enabled communications device switches from a passive mode to an active mode. It should be noted that the wakeword does not have to be the first word or sound in a given sentence or request. The voice-enabled communications device can be configured such that it can record and store a limited amount of audio input data that should, in most instances, is the amount of time needed to speak a sentence or more. Accordingly, even if a wakeword is recognized in the middle or end of a sentence, the voice-enabled communications device will have retained the entire sentence which can then be analyzed by backend servers to determine what is being requested.

An application executing on the voice-enabled communications device or otherwise in communication with the voice-enabled communications device, can analyze the user's speech that includes audio input data to perform at least one function. The functions can include, for example, answering questions, playing music, reading audiobooks, controlling connected devices via voice commands/instructions, sending an electronic message, initiating a phone call, performing an online shopping action, among other such functions.

Figure 1B:
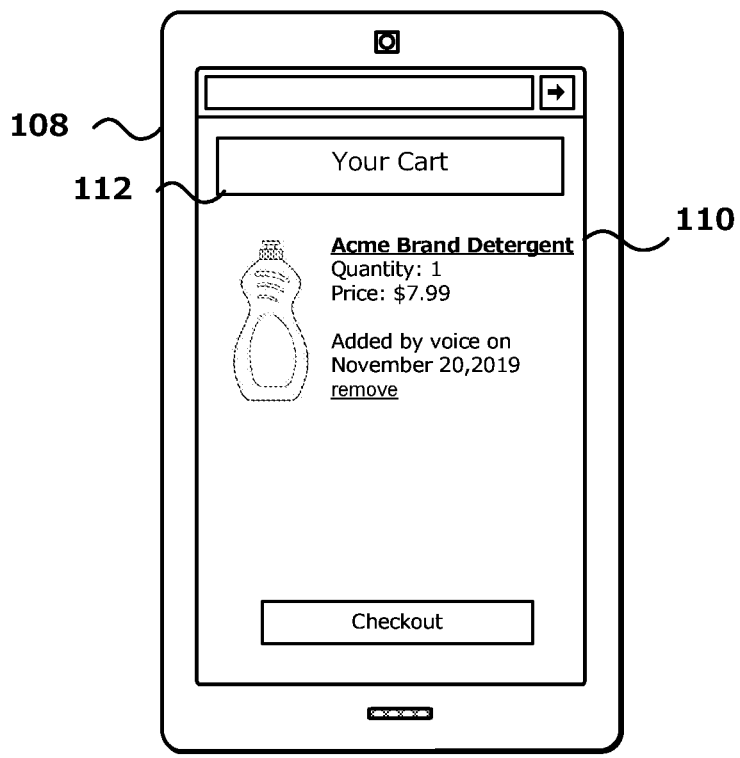
Figure 2A:
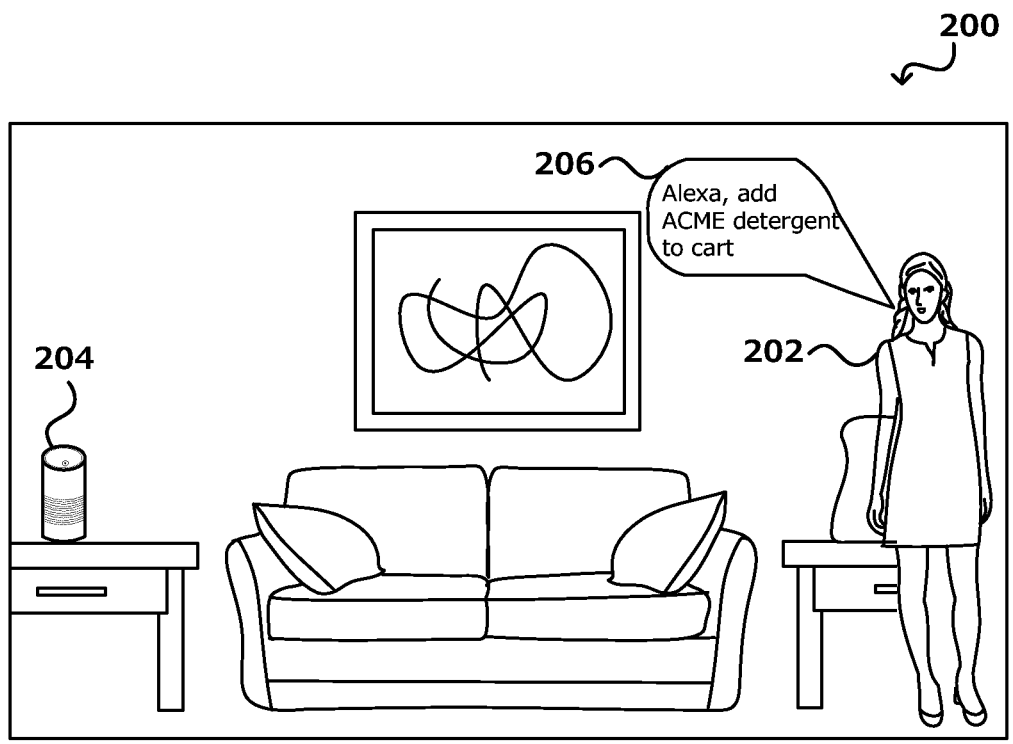
FIGS. 2A-2C illustrate an example scenario in which a user is asked to provide additional information (i.e., feedback) that helps clarify their intent, in accordance with example embodiments.
Figure 2B:
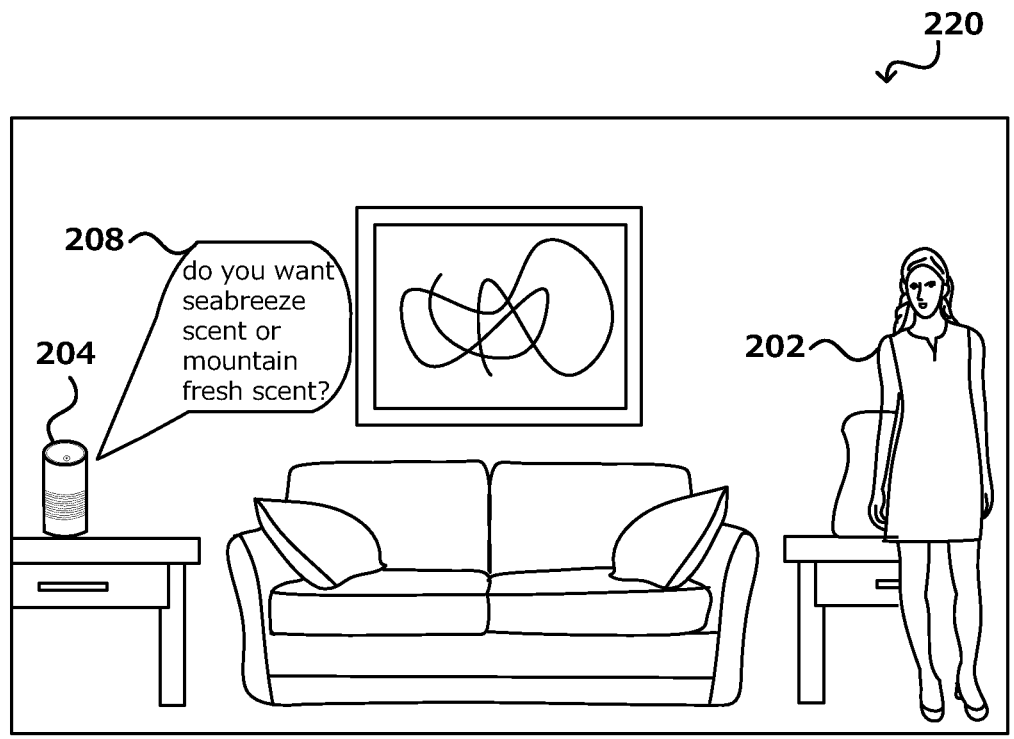
Figure 2C:
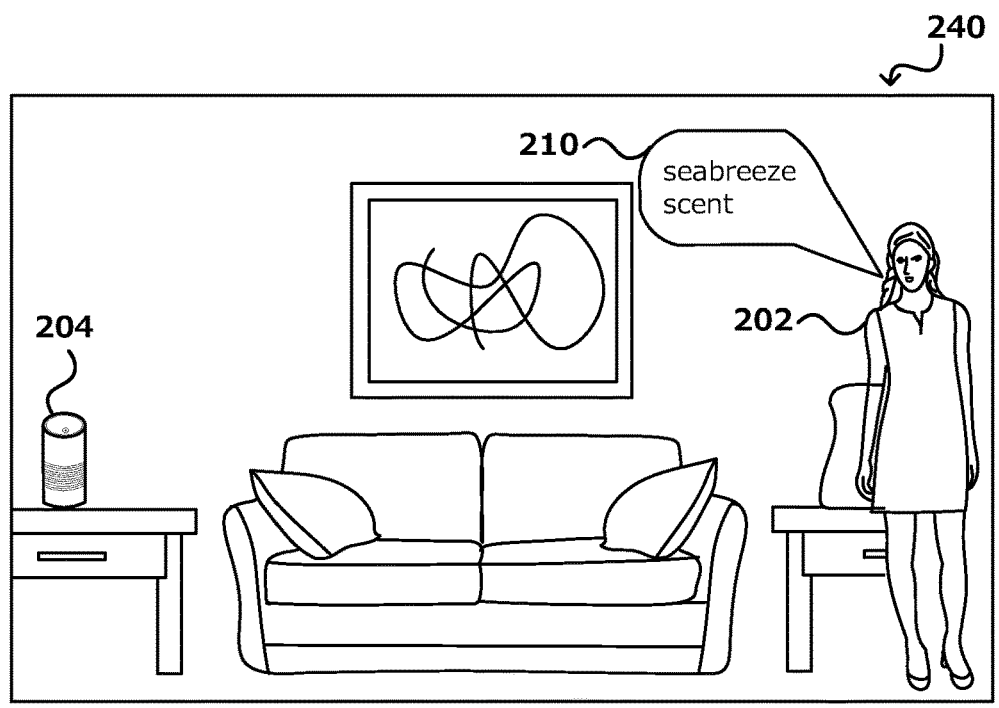

In this example, the user 102 is utilizing an online shopping function of the voice-enabled communication device 104. The device 104 may be logged into an account on an e-commerce platform through which a user can purchase or otherwise select items from an electronic catalog of items. The account may already be associated with information such as a payment method (e.g., credit card number), shipping address, billing address, and any other information needed to complete a transaction. Conventionally, the user would user a client device with a display such as a personal computer or smart phone to log onto a website to access the e-commerce platform. The user can then browse through the offerings or search using a keyword query to located products of interest. The user can perform various actions such as finding out information about a product, adding a product to cart, removing a product from cart, checking out, and the like. Typically information is output to the user visually through the graphic interface that is displayed on the display of the device and user inputs are entered manually via a peripheral device such as a mouse or keyboard. With voice control technology, a user can do these or similar actions through voice and audio communications, without the need for a device with a display or manually entered inputs. For example, and as illustrated in FIG. 1A, the user 102 may say "Alexa, add ACME brand detergent to cart", as indicated in quote bubble 106. Ideally, as illustrated in FIG. 1B, the product 110 would be added to an electronic shopping cart 112 associated with an e-commerce platform, as illustrated in FIG. 1B. The e-commerce platform and shopping cart can be accessed via a client device 108 such as a personal computer, smartphone, tablet, and the like. The client device 108 may be logged into the same user account as the voice-enabled client device 104.

In this example, the user account can be associated with a user profile. The user profile may include information such as demographic information and previous behaviors. The previous behaviors may include many types of information, such as product browsing history, purchase history, past utterances and associated actions and results, among other information. It should be noted that other approaches can be implemented to login to a particular profile. For example, each profile may be logged into by, for example, saying the wakeword then a special keyword/phrase (e.g., sign in as Jane) and/or by biometrics (i.e., speaker identification based on sound of voice and, if camera is available, facial recognition or, if fingerprint scanner, fingerprint ID), among other such approaches.

In some embodiments, the contents of the audio input data are essentially streamed to a backend server such that at least a portion of the audio input data can be received by the backend server and analysis can begin on that portion and any subsequent portions immediately upon receipt. In particular, the backend server can begin processing one or more portions of the audio input data prior to the user having completed making the instructions. Thus, the backend server can start analyzing whatever portion of the audio input data it received through a variety of techniques such as automatic speech recognition (ASR) and natural language understanding (NLU) to convert the audio input data into a series of identifiable words, and then to analyze those words in order to interpret the meaning of the request from the user. The backend server can utilize ASR techniques to recognize the spoken words that were recorded and stored in the MP3 data and to translate them into known text that can then be analyzed by NLU techniques to attempt to decipher the meaning of the request from user. Any suitable computer implemented speech-to-text technique may be used to convert the received audio signal(s) into text, such as SOFT-SOUND speech processing technologies available from the Autonomy Corporation, which is headquartered in Cambridge, England, United Kingdom. In some embodiments, one or more filters may be applied to the received audio input data to reduce or minimize extraneous noise, however this is not required. In this example, analyzing the audio input data 106 can include determining a product "ACME brand detergent" an intended action "Add to cart". The backend server can then identify the product from the electronic catalog and add it to the electronic cart associated with the user account. In some embodiments, the device 104 may provide a confirmation such as "ACME brand detergent added to cart". In this case, the electronic catalog of products may only contain one product that is responsive to the product query "ACME brand detergent".

In the ideal scenario, the system can confidently determine what action to take based on the user's voice command. However, there are many sources of errors that can cause the system to not be able to confidently determine what action to take. For example, the user's utterance may not be properly interpreted through automatic speech recognition (ASR) and natural language understanding (NLU). Errors may also occur when attempting to form a product search query from the user's utterance. For example, there may be more than one possible query that is formed from the utterance and the system cannot determine with high enough confidence which query to submit. On the other hand, it may not be possible to form any query from the utterance, which would also create an error. Another source of error may be that a search query returns more than one search result and the system cannot determine with high enough confidence which product the user actually wants. All of these errors may cause the system to be unable to determine with high enough confidence what action to take next. For example, for an ASR error, the system may be unable to determine what words to use to attempt to form queries. In the case where there are multiple possible queries that can be formed, the system may not know which query to use. In the case where more than one product is responsive to a query, the system may not know which product to add to cart. There may be other and different types of error sources than these examples.

E-commerce technology is provided as an example application of the present techniques. However, the techniques described herein can be used to improve various other technologies such as for example, answering questions, playing music, reading audiobooks, controlling connected devices via voice commands/instructions, sending an electronic message, initiating a phone call, among other such technologies. In such an event that the system needs to disambiguate between a plurality of possible interpretations and/or actions, the user may be asked to provide additional information to help the system better determine the user's original intent and what action to take.

FIGS. 2A-2D illustrates such a sequence of scenario. In the scenario 200 of FIG. 2A, a user 202 provides a voice command by saying, for example, "Alexa, add ACME brand detergent to cart", as indicated in quote bubble 206. The voice command is captured by a voice-enabled client device 204 and sent to a server for processing. In processing the voice commend, the system detects that there is some ambiguity in what action is to be performed next. The system then determine if and how to attempt to elicit more information from the user to help disambiguate between which action to perform. In some embodiments, the system utilizes one or more models to determine if and how to attempt to elicit more information from the user. The model takes into consideration various conditions surrounding the ambiguity and the error sources responsible for the ambiguity in order to determine if and how to elicit more information from the user. In this example, the error source is that there are more two products in the catalog that correspond to the keywords "Acme brand detergent". For instance, there is a "seabreeze scent" variation of the detergent and a "mountain fresh scent" variation of the detergent. In this case, the model may determine that in order to determine which of the two products the user wants, the best way too elicit the necessary information is to immediately ask the user in a dialogue manner in response to their initial voice command. Thus, as illustrated in the scenario 220 of FIG. 2B, the voice-enabled client device may say "do you want seabreeze scent or mountain fresh scent?", as indicated in quote bubble 208. As illustrated in the scenario 240 of FIG. 2C, the user 202 may then respond directly to the question with their answer through voice, just like a dialogue. For example, the user 202 may say "seabreeze scent", as indicated in quote bubble 210. In some embodiments, the user 202 may provide their answer directly without a wakeword. The answer then indicates to the system which of the two possible products to add to cart.

Figure 3:
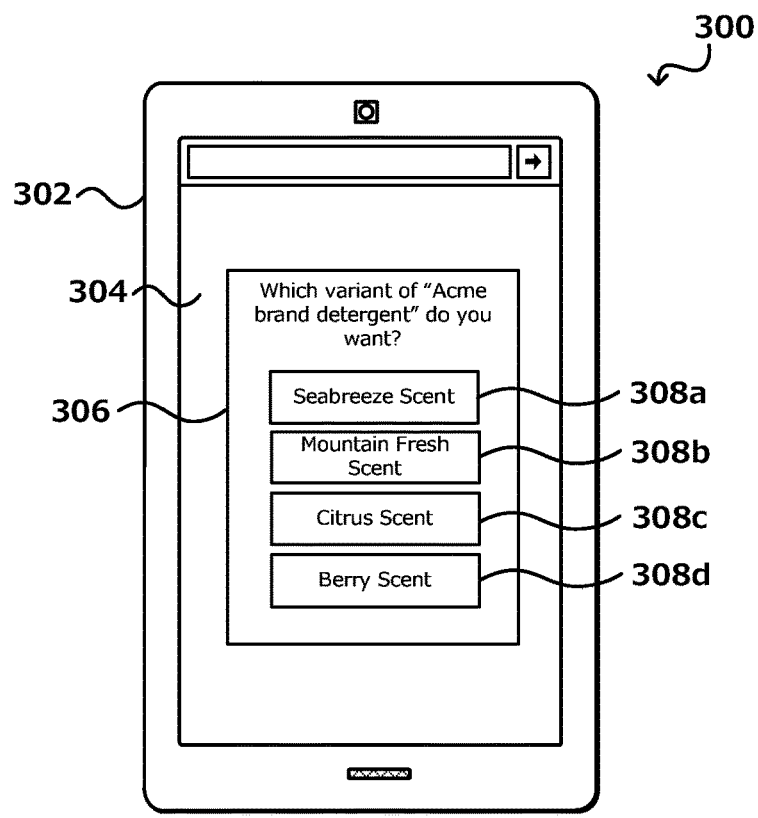
FIG. 3 illustrates an embodiment in which the additional information is elicited through a graphical interface displayed of display-based device, in accordance with example embodiments.

Alternative, in some embodiments, the model may determine that the best way to elicit the additional information needed is through a prompt in the graphic interface of the e-commerce platform displayed on a client device such as a computer or smartphone. FIG. 3 illustrates a display-based client device 302, in accordance with example embodiments. In some embodiments, a prompt 306 may appear as a pop-up as a part of the graphic interface of the e-commerce platform accessed through the device 302. The prompt 306 may be any type of graphical element that can be displayed on the display 304 of the device. The user may be prompted through the graphic interface to select between a plurality of products that were responsive to their original voice command. In this example, as illustrated in FIG. 3, the user may be prompted through the graphic interface to select between a first button 308a representing "Seabreeze Scent", a second button 308b representing "Mountain Fresh Scent", a third button 308c representing "Citrus Scent", and a fourth button 308d representing "Berry Scent". In cases in which there are more than a certain number of candidate products, eliciting feedback from the user through the graphical interface may be chosen over eliciting feedback through voice. In some cases, although ambiguity is detected, the model may determine not to elicit feedback at all if the ambiguity is of a type that is unlikely to be resolved through eliciting user feedback. In some embodiments, such determinations may be made based on a rules-based model of a statistical or machine learning model in which previous experience is used to determine future decisions.

Figure 4:
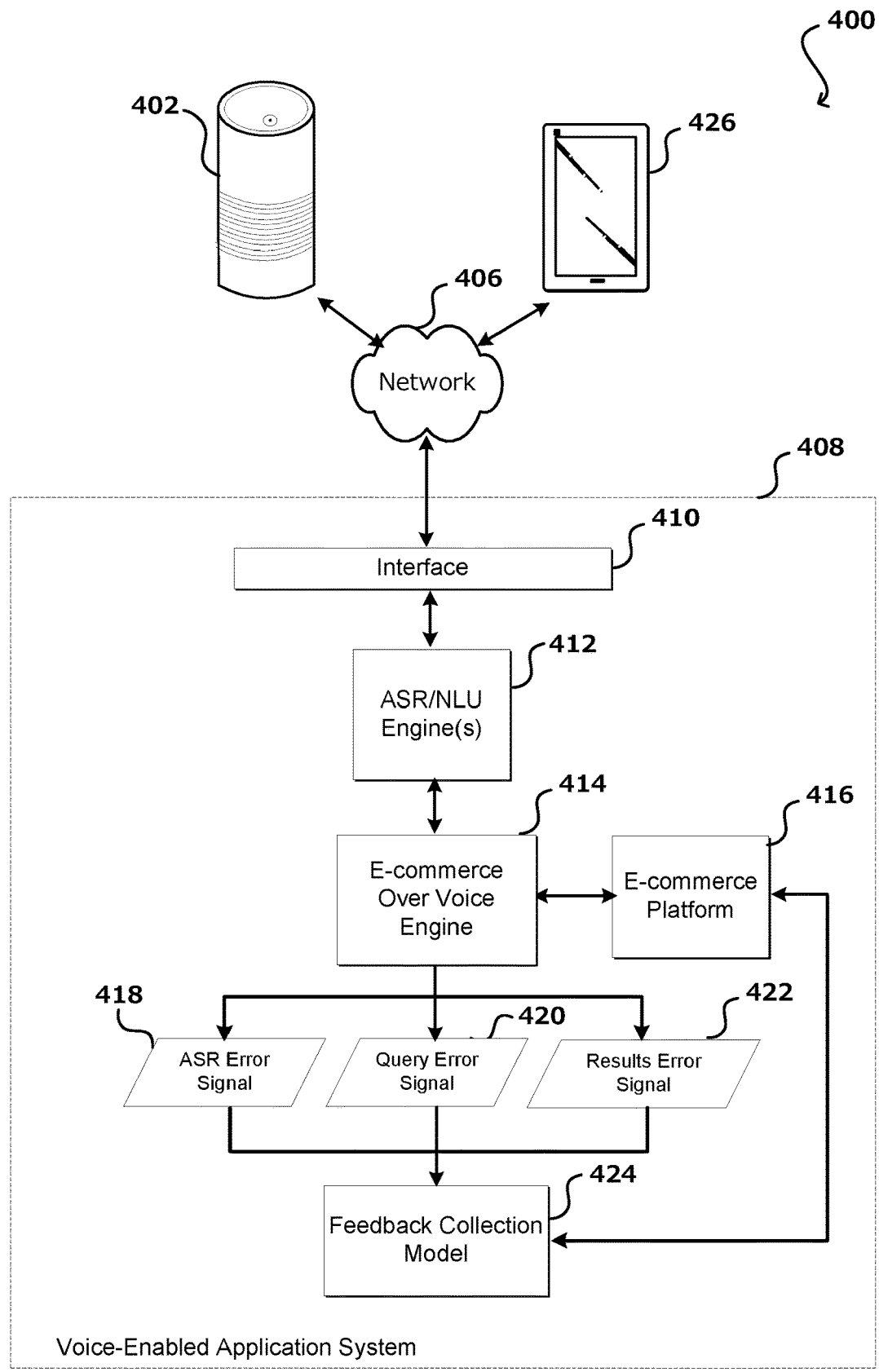
FIG. 4 illustrates a diagrammatical representation of a voice-enabled e-commerce environment with user feedback learning, in accordance with example embodiments.

FIG. 4 illustrates a diagrammatical representation of a voice-enabled e-commerce system 400 with user feedback triggering, in accordance with example embodiments. A voice-enabled client device 402 captures an utterance spoken by a user, such as a command following a wakeword. The voice-enabled client device 402 then sends the audio data representative of the utterance to a server-side voice-enabled application system 408 over a network 406. In this example, an audio signal is received from a voice-enabled client device 402 to initiate a voice-enabled shopping task. The voice-enabled client device may be any type of client device that includes an audio output device such as a speaker and an audio input device such as microphone, and network connectivity. This includes special voice-communication only devices, personal computers, tablet computers, smart phones, notebook computers, and the like. The network 406 can include any appropriate network, such as the Internet, a local area network (LAN), a cellular network, an Ethernet, Wi-Fi®, Bluetooth®, radiofrequency, or other such wired and/or wireless network. The voice-enabled application system 408 can include any appropriate resources for performing the various functions described herein, and may include various servers, data stores, and other such components known or used for providing content from across a network (or from the cloud).

The audio data from the voice-enabled client device 402 is received through an interface 410, which facilitates communications between the voice-enabled client device 402 and the voice-enabled application system 408. For example, the interface 410 may process data received over the network 406 for use by other components of the server-side voice-enabled application system 408. For example, in some embodiments, the interface 410 may perform some signal processing on the received audio data such as noise reduction, filtering, and the like. The interface 410 may also prepare data to be transmitted over the network to the voice-enabled client device. An automatic speech recognition (ASR) and natural language understanding (NLU) engine 412 can receive and interpret the audio data. In this example, the audio data, or a processed version of the audio data undergoes a variety of techniques such as to convert the audio input data into a series of identifiable words, and then to analyze those words in order to interpret the meaning of the request from the user. The backend server can utilize ASR techniques to recognize the spoken words that were recorded and stored in the audio data and to translate them into known text that can then be analyzed by NLU techniques to attempt to decipher the meaning of the request from user. In some embodiments, the ASR/NLU engine 412 can be used to determine that the user utterance in the audio data includes an e-commerce request, and is thus an e-commerce over voice engine 414 is invoked to handle the request.

The e-commerce over voice engine 414 may perform a plurality of processing steps in an attempt to fulfill the voice request. The plurality of processing steps may include analysis of the utterance text using a language understanding framework associated with the type of request. The plurality of processing steps may include generating and selecting a search query from the utterance text. The plurality of processing steps may include conducting a search of database of items using a search query. The plurality of processing steps may include additional or different steps, depending on the type of the request. The e-commerce over voice engine 414 may access the e-commerce platform 416 to obtain data, such as a product catalog and other information, for performing such steps. In some embodiments, the e-commerce over voice engine 414 may also access user account information, such as demographic information, previous purchases, a user-specific speech recognition key, among other information that may contribute the processing steps. For example, the user-specific speech recognition key may contribute to the ASR process. The purchase history may contribute to disambiguating between multiple search results.

In performing each of these processing steps, an error signal may be generated, which describes and error or ambiguity caused in that respective step. Specifically, the e-commerce over voice engine 414 may produce an ASR error signal 418, a query formation error signal 420, and a search results error signal 422. The ASR error signal 418 may indicate being unable to understand a portion of the user's utterance with a threshold level of confidence. The query formation error signal 420 may indicate an error in forming a single search query from the utterance. For example, no queries may be formed, or alternatively too many queries can be formed and the engine does not know which one to conduct a search on. The search result error signal 422 may indicate an ambiguity because a search produced are two products and does not know which one the user wants to add to their cart. Alternatively, it may indicate that there were zero products founds. An error or ambiguity may either halt the processing step or create more than one path of actions.

A feedback collection model 424 is then used to determine if and how to request additional user input to attempt to resolve the error or ambiguity. The voice-enabled device 402 or a second client device 426 is then causing to output a request for the additional user input. In some embodiments, the feedback collection model 424 may be a deterministic model with explicit rules that determine if and how to elicit feedback given certain conditions. In some embodiments, the feedback collection model 424 may be a statistical model that utilizes predictive analysis to determine if and how to elicit feedback given certain conditions. In some embodiments, the feedback collection model 424 is a machine learning model trained on previous requests for additional user input and respective outcomes of the previous requests. Generally, the feedback collection model 424 is configured to be trained to optimize for certain metrics such as response rate, purchase rate, customer satisfaction, among other positive user behaviors. For example, the feedback collection model 424 can learn how users react to a certain type of feedback prompt under certain conditions in the past, and use that information to determine if that type of feedback prompt is actually helpful or beneficial under those conditions. It may be the cause that the model learns that users are more likely not to respond or abandon the interaction when prompted for feedback in that manner. Thus, it would be less likely to select that type of prompt under those conditions in the future.

In some cases, the feedback collection model 424 may determine to request feedback from the user via the voice-enabled client device 402 over voice. This may be the cause when the feedback prompt is relatively simple to communicate over voice and the expected response can be effectively captured over voice, such as asking the user to select between two defined choices. Alternatively, the feedback collection model 424 may determine to request feedback from the user in the form of a graphical interface element for display on the second client device 426. Specifically, the feedback collection model 424 may cause the e-commerce platform 416 to generate a prompt somewhere in the interface for the user account, such as in the cart, via a notification, or the like, to collect the feedback. In some embodiments, whether the request for additional user input request is over voice or via graphical interface may be determined based at least in part on how many candidate products are in the search result. For example, the format is audio and voice communication when the number of candidate items is below a threshold number, and the format is graphical interface communication when the number of candidate items is at or above the threshold number.

Figure 5:
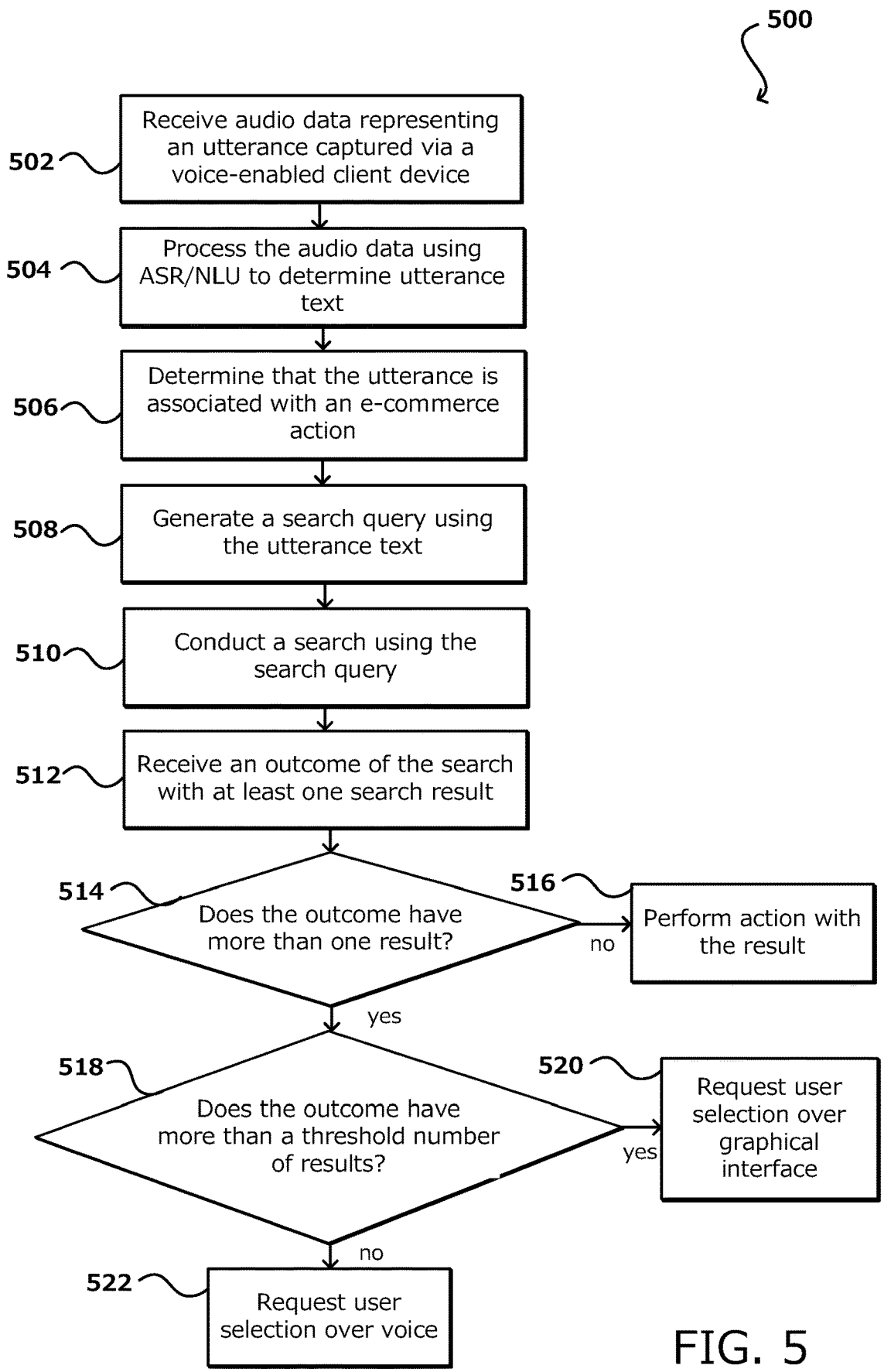
FIG. 5 illustrates an example process of eliciting user feedback to disambiguate between a plurality of possible results, in accordance with various embodiments.

FIG. 5 illustrates an example process 500 of handing a voice command that causes ambiguity, in accordance with various embodiments. It should be understood that, for any process discussed herein, there can be additional, fewer, or alternative steps performed in similar or alternative orders, or in parallel, within the scope of the various embodiments. In this example, audio data representing a user utterance is received 502. The audio data is captured by a voice-enabled device that is logged into a user account. For example, the user account may be that of an e-commerce platform that has a database of products available. The user audio data may be processed 506 through an automatic speech recognition process. In some embodiments, the automatic speech recognition process may utilize an automatic speech recognition (ASR) model, a natural language understanding (NLU) model, a contextual understanding model, and/or a named entity recognition (NER) model associated with an e-commerce platform. The audio data is used to determine 504 that the user utterance includes an e-commerce request, wherein the e-commerce request includes an item. In other cases, the audio data may include a different type of request, such as an informational request, a smart device control request, among others.

A search query associated with the user utterance is then generated 508. In some embodiments, a query formation engine uses keywords and structure found in the user utterance to attempt to form a search query. The search query is then used to search 510 the database of available products, thereby producing an outcome of the search. The outcome of the search may include one or a plurality of products that are responsive to the search query. Alternatively, the outcome of the search may produce zero responsive products. In some embodiments, being responsive to a search query indicates that a product has a score (e.g., relevance score, match score) that meets a threshold.

The outcome of the search is received 512. It may then be determined 514 whether the outcome includes more than one result. If there is more than one result then there is ambiguity in which product to take action on. If there is not more than one result, it there is only one result, then the requested action can be performed 516 on the result, such as adding the product to cart. If there is more than one result, then it is determined 518 if there is more than a threshold number of results. If there is more than the threshold number of results, then a user selected is requested 520 over graphical interface, in which the user is asked to select between the different results. If there is not more than the threshold number of results, then the user selection is requested 522 over voice.

The method of FIG. 5 illustrates one case in which there is ambiguity in which product to act on in response to an e-commerce user request. However, all of the above-described processes may be sources of ambiguity that can cause the system to not be able to confidently determine what action to take. For example, the user's utterance may not be properly interpreted through automatic speech recognition (ASR) and natural language understanding (NLU). Errors may also occur when attempting to form a product search query from the user's utterance. For example, there may be more than one possible query that is formed from the utterance and the system cannot determine with high enough confidence which query to submit. On the other hand, it may not be possible to form any query from the utterance, which would also create an error. Another source of error may be that a search query returns more than one search result and the system cannot determine with high enough confidence which product the user actually wants. All of these errors may cause the system to be unable to determine with high enough confidence what action to take next. For example, for an ASR error, the system may be unable to determine what words to use to attempt to form queries. In the case where there are multiple possible queries that can be formed, the system may not know which query to use. In the case where more than one product is responsive to a query, the system may not know which product to add to cart. There may be other and different types of error sources than these examples.

Thus, an ambiguity associated with at least one of the speech recognition, the query formation, or the search results may be detected. A model may be used to determine whether to attempt, and in what format, to elicit additional user input to try to resolve the ambiguity. The model takes into consideration various conditions surrounding the ambiguity and the error sources. For example, if the ambiguity is caused by too much background noise in the audio data, the model may determine that it would not be very helpful to ask the user to repeat themselves since the background noise most likely will not have changed. The conditions of the ambiguity may also include various contextual information, such as user/device GPS location, proximity to a certain establishment, user demographic information, previous behavior (e.g., purchase, browsing, conversion statistics), connected app, website, or product catalog, device information, among others. Such contextual information may be a source of information for performing various processing steps, including the speech recognition/understanding, search query formation, and determining/filtering product results. The contextual information may set certain bounds on or otherwise further refine, and in some cases resolve, the ambiguity. In some embodiments, contextual information may be used to filter selectable options provided in a prompt for user feedback.

In some embodiments, the model may determine to request additional user input via the voice-enabled device to attempt to resolve the ambiguity. Alternatively, the model may determine to request additional user input via a graphical interface displayed on a display-enabled client device. The additional user input may be received in the corresponding format. The user may then respond directly to the question with their answer through voice, just like a real-time dialogue. In some embodiments, the user may provide their answer directly without a wakeword. Alternatively, a prompt may be generated in the graphic interface of the e-commerce platform displayed on a client device such as a computer or smartphone. For example, the user may be prompted through the graphic interface to select between the options "coat" or "coke". Upon receiving the additional user input, if the ambiguity is resolved, a action may be performed based on the resolution of the ambiguity. For example, this may include understanding what product matches the user's intent and adding that product to the user's cart. In some embodiments, the model may determine not to request additional information.

In some embodiments, the voice-enabled client device and the display-enabled client device are signed into the same user account. In some embodiments model is a deterministic or statistical model use to determine whether to request additional user input, and in what format, given a certain ambiguity condition. In some embodiments, the model is a machine learning model trained on previous requests for additional user input and respective outcomes of the previous requests. Generally, the model is configured to be trained to optimize for certain metrics such as response rate, purchase rate, customer satisfaction, among other positive user behaviors.

Figure 6:
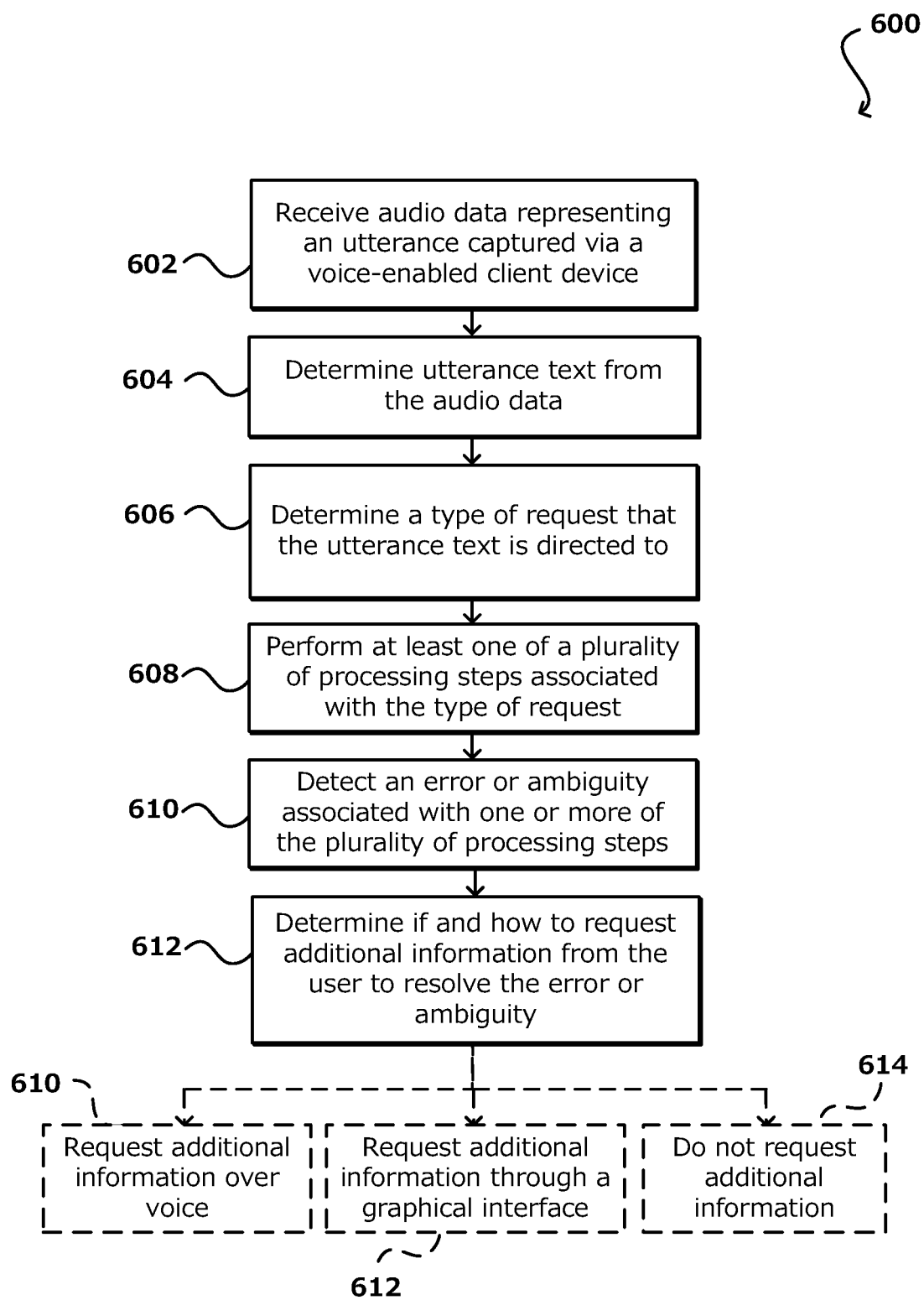
FIG. 6 illustrates another example process of eliciting user feedback to resolve errors and ambiguity, in accordance with various embodiments.

FIG. 6 is a flowchart illustrating a method 600 of resolving ambiguity in a voice command operation, in accordance with example embodiments. In this example, audio data is received 602 from a voice-enabled client device, in which the audio data is representative of an utterance captured by the device. Utterance text is then determined 604 from the audio data, such as through an at least one of an automatic speech recognition (ASR) model, a natural language understanding (NLU) model, or a named entity recognition (NER) model. In some embodiments, utterance data may be received, which may be in the form of audio data, phonemes, recognized or hypothesis text, understood intent, or any other type or stage of data derived from a voice request.

In some embodiments, the request may be a certain type of request, such as a shopping request, a smart device request, an informational request, among others. Thus, the type of request that the utterance text is directed to can be determined 606. The type of request may be determined based on the words present in the utterance text, the structure of the text, among other context. In some embodiments, each type of request is associated with a plurality of processing steps to be performed. Thus, the present request is associated with a plurality of processing steps. The plurality of processing steps may include analysis of the utterance text using a language understanding framework associated with the type of request. The plurality of processing steps may include generating and selecting a search query from the utterance text. The plurality of processing steps may include conducting a search of database of items using a search query. The plurality of processing steps may include additional or different steps, depending on the type of the request. At least one of the plurality of processing steps is performed 608.

In performing one or more of these processing steps, an error or ambiguity may be detected 610. An error or ambiguity may either halt the processing step or create more than one path of actions. An example of an error may be being unable to understand a portion of the user's utterance. An example of an ambiguity may be that the product search produced are two products and does not know which one the user wants to add to their cart. A model is then used to determine 612 if and how to request additional user input to attempt to resolve the error or ambiguity. The voice-enabled device or a second client device is then causing to output a request for the additional user input.

It may be determined that the additional user input is to be requested 610 over voice through the voice-enabled client device. Alternatively, it may be determined that the additional user input is to be requested 612 through a graphical interface on the second client device. In some embodiments, it may be determined not to request 614 additional information at all. For example, a format for the request for additional user input request may be determined based at least in part on how many candidate products are in the search result. For example, the format is audio and voice communication when the number of candidate items is below a threshold number, and the format is graphical interface communication when the number of candidate items is at or above the threshold number. In some embodiments model is a deterministic or statistical model use to determine whether to request additional user input, and in what format, given a certain ambiguity condition. In some embodiments, the model is a machine learning model trained on previous requests for additional user input and respective outcomes of the previous requests. Generally, the model is configured to be trained to optimize for certain metrics such as response rate, purchase rate, customer satisfaction, among other positive user behaviors.

In some embodiments, the additional user input is received from the voice-enabled drive or the second client device, and a next action to perform may be determined based on the additional user input. Thus, the next action may be performed. For example, it may be determined that the next action is to add a selected product to the shopping cart. The additional user input could also be a selection between two or more possible queries, and the next action to be performed can be conducting a search using the selected query.

Figure 7:
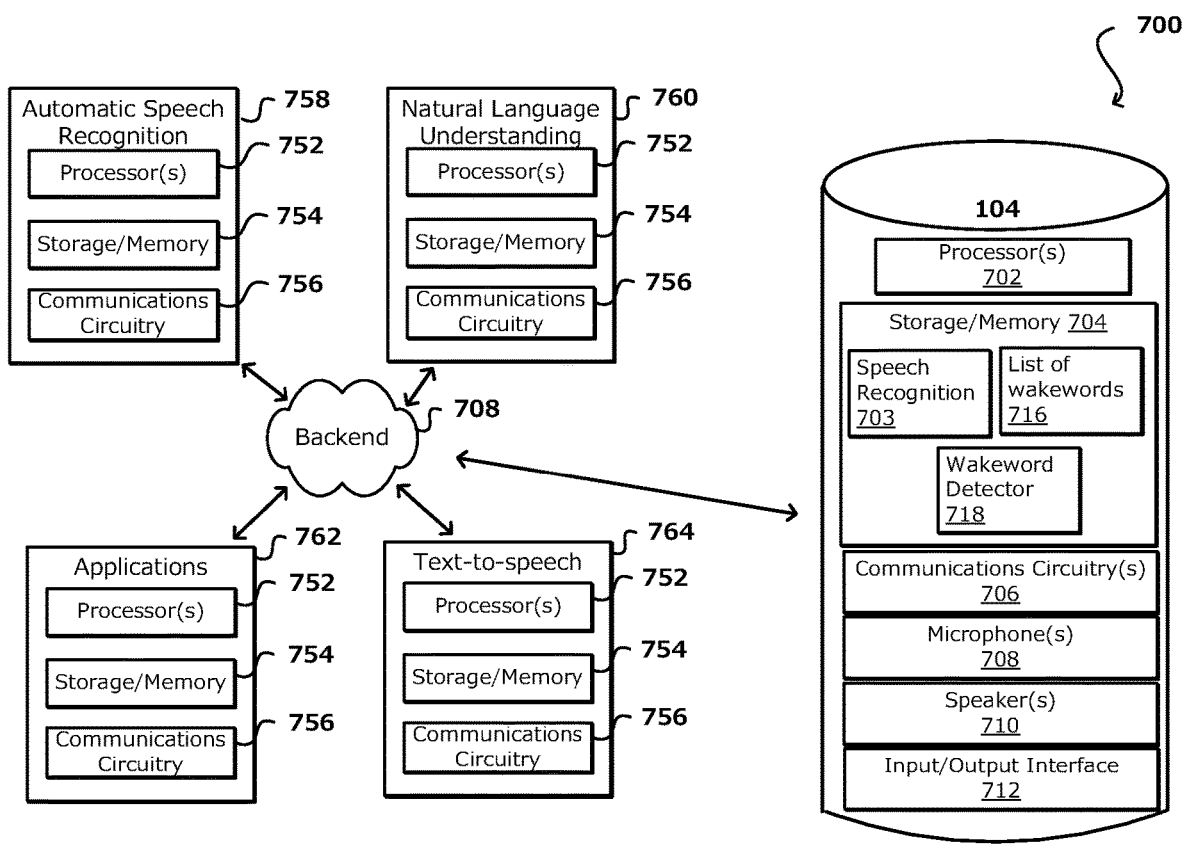
FIG. 7 illustrates an example implementation device, in accordance with various embodiments of the present disclosure.

FIG. 7 is another example environment 700 for implementing aspects in accordance with various embodiments. In this example, voice-enabled communications device 104, in some embodiments, may correspond to any type of electronic device capable of being activated in response to detecting a specific sound. Voice-enabled communications device 104 may, in some embodiments, after detecting the specific sound (e.g., a wakeword), recognize commands (e.g., audio commands, inputs) within captured audio, and may perform one or more actions in response to the received commands. Various types of electronic devices may include, but are not limited to, notebook computers, ultrabooks, tablet computers, mobile phones, smart phones, personal data assistants, video gaming consoles, televisions, set top boxes, smart televisions, portable media players, and wearable computers (e.g., smart watches, smart glasses, bracelets, etc.), display screens, displayless devices (e.g., Amazon Echo), other types of display-enabled devices, smart furniture, smart household devices, smart vehicles, smart transportation devices, and/or smart accessories, among others. In some embodiments, voice-enabled communications device 104 may be relatively simple or basic in structure such that no mechanical input option(s) (e.g., keyboard, mouse, trackpad) or touch input(s) (e.g., touchscreen, buttons) may be provided. For example, voice-enabled communications device 104 may be capable of receiving and outputting audio, and may include power, processing capabilities, storage/memory capabilities, and communication capabilities.

Voice-enabled communications device 104 may include a minimal number of input mechanisms, such as a power on/off switch, however primary functionality, in one embodiment, of voice-enabled communications device 104 may solely be through audio input and audio output. For example, voice-enabled communications device 104 may listen for a wakeword by continually monitoring local audio. In response to the wakeword being detected, voice-enabled communications device 104 may establish a connection with backend server, send audio input data to backend server, and await/receive a response from backend server. In some embodiments, however, non-voice-enabled devices may also communicate with backend server (e.g., push-to-talk devices). Voice-enabled communications device 104 may include one or more processors 702, storage/memory 704, communications circuitry 706, one or more microphones 708 or other audio input devices (e.g., transducers), one or more speakers 710 or other audio output devices, as well as an optional visual input/output ("I/O") interface 712. However, one or more additional components may be included within voice-enabled communications device 104, and/or one or more components may be omitted.

For example, voice-enabled communications device 104 may include a power supply or a bus connector. As another example, voice-enabled communications device 104 may not include a visual I/O interface. Furthermore, while multiple instances of one or more components may be included within voice-enabled communications device 104, for simplicity only one of each component has been shown. Processor(s) 702 may include any suitable processing circuitry capable of controlling operations and functionality of voice-enabled communications device 104, as well as facilitating communications between various components within voice-enabled communications device 104. In some embodiments, processor(s) 702 may include a central processing unit ("CPU"), a graphic processing unit ("GPU"), one or more microprocessors, a digital signal processor, or any other type of processor, or any combination thereof. In some embodiments, the functionality of processor(s) 702 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 702 may include its own local memory, which may store program modules, program data, and/or one or more operating systems. However, processor(s) 702 may run an operating system ("OS") for voice-enabled communications device 104, and/or one or more firmware applications, media applications, and/or applications resident thereon. Storage/memory 704 may include one or more types of storage mediums such as any volatile or non-volatile memory, or any removable or non-removable memory implemented in any suitable manner to store data on voice-enabled communications device 104. For example, information may be stored using computer-readable instructions, data structures, and/or program modules.

Various types of storage/memory may include, but are not limited to, hard drives, solid state drives, flash memory, permanent memory (e.g., ROM), electronically erasable programmable read-only memory ("EEPROM"), CD ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 704 may be implemented as computer-readable storage media ("CRSM"), which may be any available physical media accessible by processor(s) 702 to execute one or more instructions stored within storage/memory 704. In some embodiments, one or more applications (e.g., gaming, music, video, calendars, lists, etc.) may be run by processor(s) 702, and may be stored in memory 704. In some embodiments, storage/memory 704 may include one or more modules and/or databases, such as speech recognition module 703, list of wakewords database 716, and wakeword detection module 718. Speech recognition module 703 may, for example, include an automatic speech recognition ("ASR") component that recognizes human speech in detected audio. Speech recognition module 703 may also include a natural language understanding ("NLU") component that determines user intent based on the detected audio. Also included within speech recognition module 703 may be a text-to-speech ("TTS") component capable of converting text to speech to be outputted by speaker(s) 710, and/or a speech-to-text ("STT") component capable of converting received audio signals into text to be sent to backend server 708 for processing. List of wakewords database 716 may be a database stored locally on voice-enabled communications device 104 that includes a list of a current wakeword for voice-enabled communications device 104, as well as one or more previously used, or alternative, wakewords for voice-enabled communications device.

In some embodiments, user 104 may set or program a wakeword for voice-enabled communications device 104. The wakeword may be programmed directly on voice-enabled communications device 104, or a wakeword or words may be set by the individual via a backend server application (app) that is in communication with backend server 708. For example, a user may use their mobile device having the backend server application running thereon to set the wakeword. The specific wakeword may then be communicated from the mobile device to backend server 708, which in turn may send/notify voice-enabled communications device 104 of the individual's selection for the wakeword. The selected activation may then be stored in list of wakewords database 716 of storage/memory 704. Wakeword detection module 718 may include an expression detector that analyzes an audio signal produced by microphone(s) 708 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 708. Rather than producing a transcription of words of the speech, a keyword spotter generates a true/false output (e.g., a logical I/O) to indicate whether or not the predefined word or expression was represented in the audio signal.

In some embodiments, an expression detector may be configured to analyze the audio signal to produce a score indicating a likelihood that the wakeword is represented within the audio signal detected by microphone(s) 708. The expression detector may then compare that score to a threshold to determine whether the wakeword will be declared as having been spoken. In some embodiments, a keyword spotter may be use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An HMM model represents a word as a series of states. Generally a portion of an audio signal is analyzed by comparing its HMM model to an HMM model of the trigger expression, yielding a feature score that represents the similarity of the audio signal model to the trigger expression model. In practice, an HMM recognizer may produce multiple feature scores, corresponding to different features of the HMI models. An expression detector may use a support vector machine ("SVM") classifier that receives the one or more feature scores produced by the HMI recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, voice-enabled communications device 104 may then begin sending the audio signal to backend server 708 for detecting and responds to subsequent utterances made by a user.

Communications circuitry 706 may include any circuitry allowing or enabling voice-enabled communications device 104 to communicate with one or more devices, servers, and/or systems. For example, communications circuitry 706 may facilitate communications between voice-enabled communications device 104 and backend server 708. Communications circuitry 706 may use any communications protocol, such as any of the previously mentioned exemplary communications protocols. In some embodiments, voice-enabled communications device 104 may include an antenna to facilitate wireless communications with a network using various wireless technologies (e.g., Wi-Fi, Bluetooth, radiofrequency, etc.). In yet another embodiment, voice-enabled communications device 104 may include one or more universal serial bus ("USB") ports, one or more Ethernet or broadband ports, and/or any other type of hardwire access port so that communications circuitry 706 allows voice-enabled communications device 104 to communicate with one or more communications networks. Voice-enabled communications device 104 may also include one or more microphones 708 and/or transducers. Microphone(s) 708 may be any suitable component capable of detecting audio signals. For example, microphone(s) 708 may include one or more sensors for generating electrical signals and circuitry capable of processing the generated electrical signals. In some embodiments, microphone(s) 708 may include multiple microphones capable of detecting various frequency levels. As an illustrative example, voice-enabled communications device 104 may include multiple microphones (e.g., four, seven, ten, etc.) placed at various positions about voice-enabled communications device 104 to monitor/capture any audio outputted in the environment where voice-enabled communications device 104 is located. The various microphones 708 may include some microphones optimized for distant sounds, while some microphones may be optimized for sounds occurring within a close range of voice-enabled communications device 104. Voice-enabled communications device 104 may further include one or more speakers 710.

Speaker(s) 710 may correspond to any suitable mechanism for outputting audio signals. For example, speaker(s) 710 may include one or more speaker units, transducers, arrays of speakers, and/or arrays of transducers that may be capable of broadcasting audio signals and or audio content to a surrounding area where voice-enabled communications device 104 may be located. In some embodiments, speaker(s) 710 may include headphones or ear buds, which may be wirelessly wired, or hard-wired, to voice-enabled communications device 104, that may be capable of broadcasting audio. In some embodiments, one or more microphones 708 may serve as input devices to receive audio inputs, such as speech. Voice-enabled communications device 104, may then also include one or more speakers 710 to output audible responses. In this manner, voice-enabled communications device 104 may function solely through speech or audio, without the use or need for any input mechanisms or displays. In one exemplary embodiment, voice-enabled communications device 104 includes I/O interface 712. The input portion of I/O interface 712 may correspond to any suitable mechanism for receiving inputs from a user of voice-enabled communications device 104. For example, a camera, keyboard, mouse, joystick, or external controller may be used as an input mechanism for I/O interface 712. The output portion of I/O interface 712 may correspond to any suitable mechanism for generating outputs from voice-enabled communications device 104. For example, one or more displays may be used as an output mechanism for I/O interface 712. As another example, one or more lights, light emitting diodes ("LEDs"), or other visual indicator(s) may be used to output signals via I/O interface 712 of voice-enabled communications device 104. In some embodiments, one or more vibrating mechanisms or other haptic features may be included with I/O interface 712 to provide a haptic response to user 104 from voice-enabled communications device 104. Persons of ordinary skill in the art will recognize that, in some embodiments, one or more features of I/O interface 712 may be included in a purely voice-enabled version of voice communications device 104. For example, one or more LED lights may be included on voice-enabled communications device 104 such that, when microphone(s) 708 receive audio from user 104, the one or more LED lights become illuminated signifying that audio has been received by voice-enabled communications device 104. In some embodiments, I/O interface 712 may include a display screen and/or touch screen, which may be any size and/or shape and may be located at any portion of voice-enabled communications device 104.

Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display screen including capacitive sensing panels capable of recognizing touch inputs thereon. FIG. 7 also includes backend server 766, as mentioned previously, which may be in communication with voice-enabled communications device 104. Backend server 766 (e.g., part of a resource provider environment) includes various components and modules including, but not limited to, automatic speech recognition ("ASR") module 758 (which may include, for example, speech-to-text ("STT") functionality), natural language understanding ("NLU") module 760, applications module 762, and text-to-speech ("TTS") module 764. In some embodiments, backend server 766 may also include computer readable media, including, but not limited to, flash memory, random access memory ("RAM"), and/or read-only memory ("ROM"). Backend server 766 may also include various modules that store software, hardware, logic, instructions, and/or commands, such as, a speaker identification ("ID") module, a user profile module, or any other module, or any combination thereof. The speech-to-text functionality and text-to-speech functionality may be combined into a single module capable of performing both STT and TTS processing, or separate TTS and STT modules may, alternatively, be used. ASR module 758 may be configured such that it recognizes human speech in detected audio, such as audio captured by voice-enabled communications device 104, which is then sent to backend server 766.

ASR module 758 may include, in one embodiment, one or more processor(s) 752, storage/memory 754, and communications circuitry 756. Processor(s) 752, storage/memory 754, and communications circuitry 756 may, in some embodiments, be substantially similar to processor(s) 702, storage/memory 704, and communications circuitry 706, which are described in greater detail above, and the aforementioned descriptions of the latter may apply. NLU module 760 may be configured such that it determines user intent based on the detected audio received from voice-enabled communications device 104. NLU module 760 may include processor(s) 752, storage/memory 754, and communications circuitry 756. Applications module 762 may, for example, correspond to various action specific applications or servers capable of processing various task specific actions. Applications module 762 may further correspond to first party applications and/or third party applications operable to perform different tasks or actions. For example, based on the context of audio received from voice-enabled communications device 104, backend server 766 may use a certain application to perform an action, such refining an active play queue of media content.

Applications module 762 may include processor(s) 752, storage/memory 754, and communications circuitry 756. As an illustrative example, applications module 762 may correspond to a media service. The electronic media service application of the applications module 762 can be associated with a customer account. The customer account can include at least one profile stored in, for example, user information that can be linked to the electronic media service application in applications module 762. Audio input data can be received at automatic speech recognition module 758 from voice communications device 104. The automatic speech recognition module 758 can use automatic speech recognition (ASR) techniques on the audio input data to generate text data of the audio input data. The natural language understanding module 760 can use natural language understanding (NLU) techniques on the text data to determine refinement/attribute information to manage the active play queue. The electronic media service application of the applications module 762 can receive information that can be used to refine or otherwise control the playback of media content, where refining the playback of media content can include filtering media content from an active play queue of media content, adding media content to the active play queue of media content, re-ordering the sequence of content in the play-queue, supplementing the active play queue, and/or changing the frequency of playback of content in the play-queue. In accordance with an embodiment, the application can determine whether there is an active play queue of media content configured to play on the voice communications device, such as a playlist of music, a station of music, a mix of songs, etc.

In the situation where there is no media content being played by the voice communications device or no active play queue of media content, the electronic media service application determines media content using information in the request. The information can be used to search a catalog of media content to identify media content in response to the spoken question or request. For example, the information can be used to identify media content associated with a mood, a tempo, a genre, an artist, a year, a decade, an activity as well as any other topic or interest. The identified media can thereafter be played using the voice communications device. In the situation where there is an active play queue of media content, the information can be used to refine the play queue. For example, the information can include instructions such as refinement instructions that can be used to filter the play queue and/or add media content to the play queue from a catalog of media content. In various embodiments, the user can further refine the playback of media content. For example, in the situation where the user is engaging in a multi-turn dialog interaction with the voice communications device, where the user sends multiple requests to the voice communications device to refine the media playing, the user can first instruct the device to play "happy" music. If the user desires "happier" music, the user can instruct the voice communications device to play "happier" music. TTS module 764 may employ various text-to-speech techniques. It should be noted that techniques for taking text and converting it into audio input data that can represent speech are well known in the art and need not be described in further detail herein, any suitable computer implemented techniques may be used. TTS module 764 may also include processor(s) 752, storage/memory 754, and communications circuitry 756. Persons of ordinary skill in the art will recognize that although each of ASR module 758, NLU module 760, applications module 762, and TTS module 764 include instances of processor(s) 752, storage/memory 754, and communications circuitry 756, those instances of processor(s) 752, storage/memory 754, and communications circuitry 756 within each of ASR module 758, NLU module 760, applications module 762, and STT/TTS module 764 may differ. For example, the structure, function, and style of processor(s) 752 within ASR module 758 may be substantially similar to the structure, function, and style of processor(s) 752 within NLU module 760, however the actual processor(s) 752 need not be the same entity.

Figure 8:
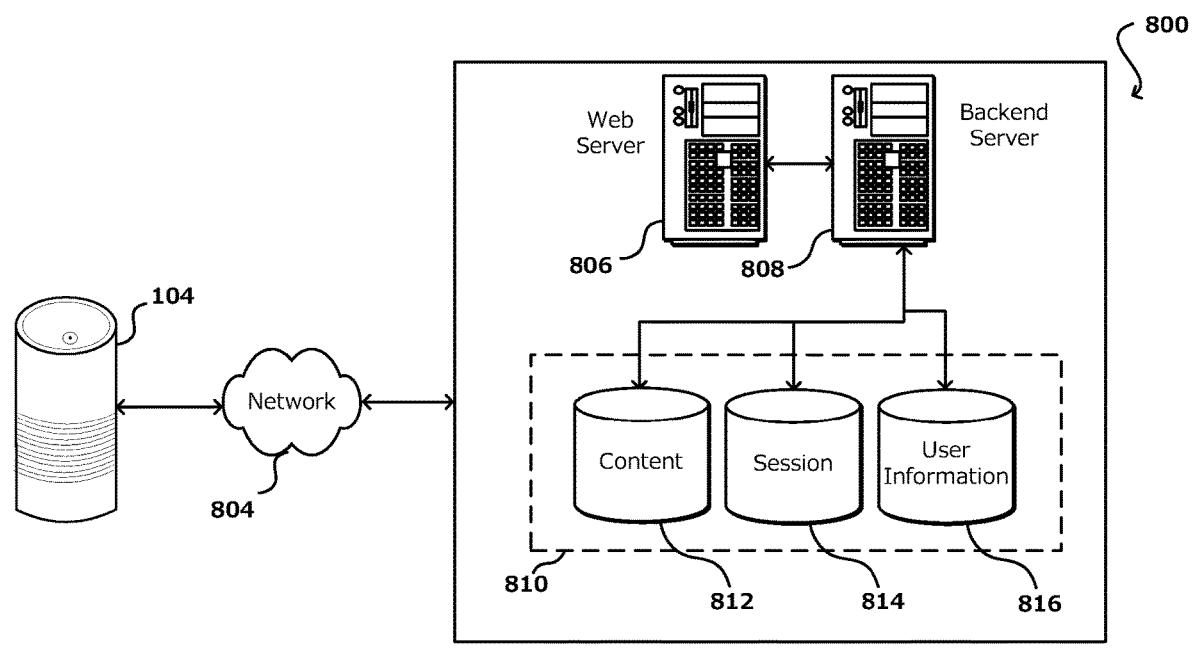
FIG. 8 illustrates an example implementation environment, in accordance with various embodiments of the present disclosure.

In accordance with various embodiments, different approaches can be implemented in various environments in accordance with the described embodiments. For example, FIG. 8 illustrates an example of an environment 800 for implementing aspects in accordance with various embodiments (e.g., a resource provider environment). In accordance with various embodiments, different approaches can be implemented in various environments in accordance with the described embodiments. As will be appreciated, although a Web-based environment is used for purposes of explanation, different environments may be used, as appropriate, to implement various embodiments. The system includes voice communications device 104, which can include any appropriate device operable to send and receive requests, messages or information over network 804 and convey information back to an appropriate device.

The network can include any appropriate network, including a telephone network provided by a telecommunication operator, an intranet, the Internet, a cellular network, a local area network, wireless network, or any other such network or combination thereof. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art. The illustrative environment includes at least one backend server 808 and a data store 810. It should be understood that there can be several backend servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The backend server 808 can include any appropriate hardware and software for integrating with the data store 810 as needed to execute aspects of one or more applications for the client device and handling a majority of the data access and business logic for an application. The application server provides access control services in cooperation with the data store and is able to analyze audio date and other data as well as generate content such as text, graphics, audio and/or video to be transferred to the user, which may be served to the user by the Web server 806 in the form of HTML, XML or another appropriate structured language in this example. The handling of all requests and responses, as well as the delivery of content between the voice communications device 104 and the backend server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be other information that may need to be stored in the data store, such as page image information and access rights information, which can be stored in any of the above listed mechanisms as appropriate or in additional mechanisms in the data store 810. The data store 810 is operable, through logic associated therewith, to receive instructions from the backend server 808 and obtain, update or otherwise process data in response thereto. In one such example, the voice communications device can receive a request to refine the playback of media content, such as music, news, audio books, audio broadcasts, and other such content. In this case, the data store might access the user information to verify the identity of the user and access a media service to determine media content the user is associated with. The user's speech can be analyzed and used to generate an updated active play queue or initiate the playback of media content. Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein. The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network. Most embodiments utilize at least one network that would be familiar to those skilled in the art for supporting communications using any of a variety of commercially-available protocols, such as TCP/IP, OSI, FTP, UPnP, NFS, CIFS and AppleTalk.

The network can be, for example, a local area network, a wide-area network, a virtual private network, the Internet, an intranet, an extranet, a public switched telephone network, an infrared network, a wireless network and any combination thereof. In embodiments utilizing a Web server, the Web server can run any of a variety of server or mid-tier applications, including HTTP servers, FTP servers, CGI servers, data servers, Java® servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl®, Python® or TCL, as well as combinations thereof. The server(s) may also include database servers, including without limitation those commercially available from Oracle®, Microsoft®, Sybase®, and IBM®. The environment can include a variety of data stores and other memory and storage media as discussed above. These can reside in a variety of locations, such as on a storage medium local to (and/or resident in) one or more of the computers or remote from any or all of the computers across the network.

In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display screen or keypad, microphone, camera, etc.) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc. Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, sending and retrieving computer-readable information.

The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed. Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving utterance data associated with a voice request;
   determining a type of request that the utterance data is directed to, the type of request associated with an action to be performed for information or control using a plurality of processing steps;
   perform at least one of the plurality of processing steps;
   detecting an error based at least in part on one or more of the plurality of processing steps;
   determining, based on a model, to request additional user input associated with the error; and
   causing the voice-enabled device or a second client device to output a request for the additional user input.

2. The method of claim 1, wherein the request for additional user input is in the form of an audio output from the voice-enabled device.

3. The method of claim 1, wherein the request for additional user input is in the form of a graphical interface element for display on the second client device.

4. The method of claim 1, wherein the plurality of processing steps includes analysis of the utterance data using a language understanding framework associated with the type of request, and wherein the error is based at least in part on the analysis.

5. The method of claim 1, wherein the plurality of processing steps includes generating and selecting a search query from the utterance data, and wherein the error is associated with generating or selecting the search query.

6. The method of claim 1, wherein the plurality of processing steps includes conducting a search of database of items using a search query, and wherein the error is based at least in part on an outcome of the search.

7. The method of claim 6, further comprising: determining a format for the request for additional user input based at least in part on the number of candidate items resulting from the request.

8. The method of claim 7, wherein the format is audio and voice communication when the number of candidate items is below a threshold number, and wherein the format is graphical interface communication when the number of candidate items is at or above the threshold number.

9. The method of claim 1, wherein the model that is used to request the additional user input associated with the error is one of a deterministic model or a statistical model, and wherein the model is used to determine to request additional user input and an associated format based in part on an ambiguity condition.

10. The method of claim 1, wherein the model is a machine learning model trained on previous requests for additional user input and respective outcomes of the previous requests.

11. The method of claim 1, wherein the voice-enabled device and second client device are signed into the same user account.

12. The method of claim 1, further comprising:
    receiving the additional user input from the voice-enabled device or the second client device;
    determining an action to perform based on the additional user input; and
    performing the next action.

13. The method of claim 1, wherein the action to be performed for the information or the control comprises an e-commerce request for an item, an informational request associated with a context, or a smart device control request for a smart device.

14. A system, comprising:
    at least one computing device processor; and
    a memory device including instructions that, when executed by the at least one computing device processor, cause the system to:
        receive utterance data associated with a voice request;
        determine a type of request that the utterance data is directed to, the type of request associated with an action to be performed for information or control using a plurality of processing steps;
        perform at least one of the plurality of processing steps;
        detect an error based at least in part on one or more of the plurality of processing steps;
        determine, based on a model, to request additional user input associated with the error; and
        cause the voice-enabled device or a second client device to output a request for the additional user input.

15. The system of claim 14, wherein the plurality of processing steps includes analysis of the utterance data using a language understanding framework associated with the type of request, and wherein the error is based at least in part on the analysis.

16. The system of claim 14, wherein the plurality of processing steps includes generating and selecting a search query from the utterance data, and wherein the error is associated with generating or selecting the search query.

17. A non-transitory computer-readable storage medium storing instructions that, when executed by a processor of a computing device, cause the computing device to:
    receive utterance data associated with a voice request;
    determine a type of request that the utterance data is directed to, the type of request associated with an action to be performed for information or control using a plurality of processing steps;
    perform at least one of the plurality of processing steps;
    detect an error based at least in part on one or more of the plurality of processing steps;

determine, based on a model, to request additional user input associated with the error; and cause the voice-enabled device or a second client device to output a request for the additional user input.

18. The non-transitory computer-readable storage medium of claim 17, wherein the instructions when executed further cause the computing device to:

request for additional user input in the form of an audio output from the voice-enabled device.

19. The non-transitory computer-readable storage medium of claim 17, wherein the instructions when executed further cause the computing device to:

request for additional user input in the form of a graphical interface element for display on the second client device.

20. The non-transitory computer-readable storage medium of claim 17, wherein the instructions when executed further cause the computing device to:

perform the plurality of processing steps which includes analysis of the utterance data using a language understanding framework associated with the type of request, and wherein the error is based at least in part on the analysis.

21. The non-transitory computer-readable storage medium of claim 17, wherein the instructions when executed further cause the computing device to:

perform the plurality of processing steps which includes generating and selecting a search query from the utterance data, and wherein the error is associated with generating or selecting the search query.

* * * * *